(No Model.)
D. E. DAVIS.
CHURN DASHER.
No. 255,604.	Patented Mar. 28, 1882.
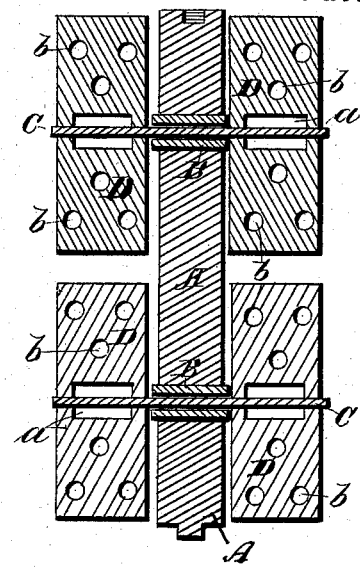
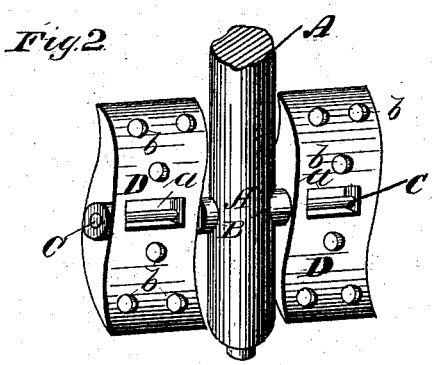
WITNESSES
Fred. G. Dieterich.
Will R. Omohundro.
By his Attorneys
David E Davis
INVENTOR
Louis Bagger & Co.

UNITED STATES PATENT OFFICE.

DAVID E. DAVIS, OF MARION, VIRGINIA.

CHURN-DASHER.

SPECIFICATION forming part of Letters Patent No. 255,604, dated March 28, 1882.

Application filed September 12, 1881. (No model.)

*To all whom it may concern:*

Be it known that I, DAVID E. DAVIS, of Marion, in the county of Smythe and State of Virginia, have invented certain new and useful Improvements in Churn-Dashers; and I do hereby declare that the following is a full, clear, and exact description of the invention, which will enable others skilled in the art to which it appertains to make and use the same, reference being had to the accompanying drawings, which form a part of this specification, and in which—

Figure 1 is a vertical section of a churn-dasher embodying my improvement; and Fig. 2 is a perspective view of the lower part of the staff, showing one pair of its wings or stirrers.

Similar letters of reference indicate corresponding parts in both the figures.

My invention contemplates an improved construction of dashers or agitators for churns, and has for its object to facilitate and expedite the operation of churning.

It consists in the combination, with a vertical dasher-staff, of pivoted wings or stirrers, substantially as hereinafter more fully set forth, and particularly pointed out in the claim.

In the annexed drawings, A is the dasher-staff, made, by preference, of wood, and having two or more transverse thimbles, B, through which arms C are inserted loosely.

Upon opposite ends of the arms C are affixed the stirrer wings or blades D, which may be made of wood or cast-iron—I prefer the latter on account of its durability—and are of the configuration clearly shown in Fig. 2 of the drawings, from which it will be seen that each wing is curved into an S shape and has a central slot or opening, *a*, through which the arm C carrying the wings is inserted. The upper and lower curved parts of each of the wings are perforated, as shown at *b b*, for the passage of the cream as the dasher is being rotated.

This dasher churns very rapidly, is easily operated, and can be readily cleaned when desired. The thimbles B, it will be seen, project a little on both sides of the staff through which they are inserted, thus preventing the sides of the vibrating wings D from bearing against the staff, which would interfere with their free and unobstructed motion.

Having thus described my invention, I claim and desire to secure by Letters Patent of the United States—

The combination of the dasher-staff A, having transverse thimbles B, projecting on both sides thereof, arms C, inserted loosely through said thimbles, and S-shaped wings D, secured upon arms C, and having the apertures *a b*, substantially as and for the purpose herein shown and specified.

In testimony that I claim the foregoing as my own, I have hereunto affixed my signature in presence of two witnesses.

DAVID E. DAVIS.

Witnesses:
W. M. DAVIS,
H. HORN.